No. 12,303. REISSUED JAN. 17, 1905.

J. B. BRADEN.

ROPE OR CABLE CLAMP.

APPLICATION FILED DEC. 5, 1904.

John B. Braden, Inventor

By E. G. Siggers

Attorney

Witnesses

Jas. G. McCathran

B. G. Foster

No. 12,303. Reissued January 17, 1905.

UNITED STATES PATENT OFFICE.

JOHN B. BRADEN, OF SALEM, WEST VIRGINIA, ASSIGNOR OF ONE-HALF TO FRED G. IRVINE, OF MARIETTA, OHIO.

ROPE OR CABLE CLAMP.

SPECIFICATION forming part of Reissued Letters Patent No. 12,303, dated January 17, 1905.

Original No. 713,738, dated November 18, 1902. Application for reissue filed December 5, 1904. Serial No. 235,599.

*To all whom it may concern:*

Be it known that I, JOHN B. BRADEN, a citizen of the United States, residing at Salem, in the county of Harrison and State of West Virginia, have invented a new and useful Rope or Cable Clamp, of which the following is a specification.

The present invention relates to clamps for ropes, cables, and similar articles, and especially to that class employed in drilling or cleaning oil and Artesian wells.

One of the objects of the invention is to improve the clamps of this character by providing a structure which will tightly clamp the rope or cable, but may be readily and instantly released without the liability of the clamps becoming wedged or jammed in their operative positions.

Another object is to provide means for simultaneously raising the clamping elements from their seats and holding them in inoperative position with relation thereto while the rope or cable is being adjusted, said means permitting of the reseating of the clamps when the desired adjustment has been obtained.

In the accompanying drawings there is shown the preferred embodiment of the present invention, and this embodiment is fully described in the following specification. It will of course be understood that such changes may be made from the construction shown and described as the scope of the appended claims will permit.

Figure 1:
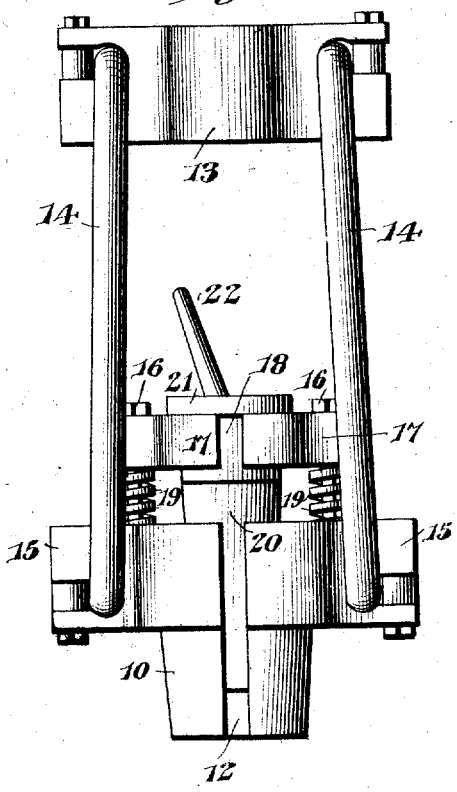
Figure 2:
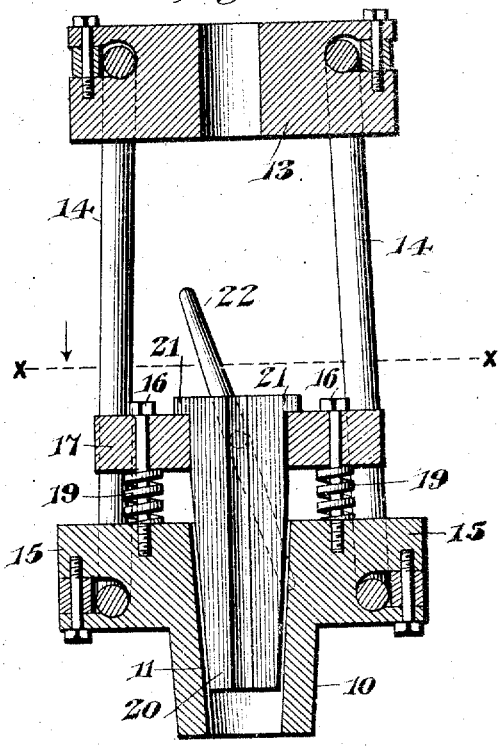
Figure 3:
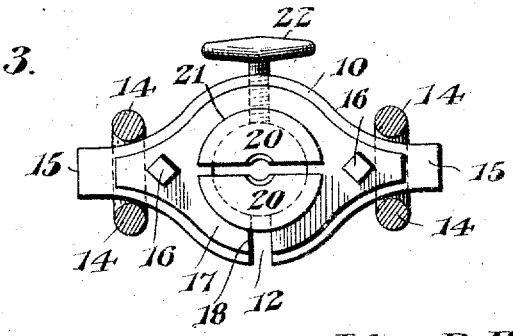

In the drawings, Figure 1 is a side elevation of the improved clamping device. Fig. 2 is a vertical sectional view through the same. Fig. 3 is a horizontal sectional view taken on the line *x x* of Fig. 2.

Similar reference-numerals designate corresponding parts in all the figures of the drawings.

In carrying out the present invention a body 10 is provided, having a vertically-disposed tapering socket 11 and a slot 12 communicating with said socket to permit the insertion and removal of the cable, as will be readily understood. This body is suspended from the usual swivel-bar 13 by means of links 14, that are secured to ears 15, located on opposite sides of the body. The body is furthermore provided upon its upper face with guides in the form of bolts 16, located on opposite sides of the socket, and a holding device in the form of a yoke 17 is slidably mounted upon these guides; said yoke being provided with a slot 18, that is in alinement with the slot 12. Interposed between the body and the holding-yoke are coiled springs 19, which preferably surround the guides and form yielding supports for said yoke. Tapered slips 20 pass through the yoke and engage in the tapered socket of the body, said slips being provided at their upper ends with outstanding flanges 21, that rest upon the upper face of the yoke, whereby said slips will be moved upwardly upon the movement of the yoke. The yoke is provided with a handled set-screw 22, by means of which the slips may be clamped to said yoke in the manner well understood.

The application of the device will be readily understood by those skilled in the art. The swiveled bar is suspended from the temper-screw in the usual manner and the rope or cable inserted in the body and the holding-yoke by being passed through the alined slots thereof. The slips are then placed upon the rope or cable and are allowed to drop down through the yoke until their flanges rest upon the upper face thereof. In this position the main portions of the slips will be located within the socket of the body, but will be out of binding engagement with the walls thereof. They will, however, clamp the cable tightly enough to prevent said cable slipping through the device, but will permit of the ready adjustment of the same. When such adjustment has been obtained, the slips are clamped upon the cable by the set-screw, and are seated in the socket of the body either by raising the entire device or by dropping the cable and are thus clamped. They will thus tightly bind the line or rope, and the machine is ready for operation. Should it be desired to take out the cable or release it from the clamp, it is only necessary to again separate the parts, whereupon the springs will lift the yoke, and consequently the slips, from their binding engagement when the strain of the tools is released therefrom.

By this construction it will be seen that a simple device is provided which permits of the ready adjustment of the line or cable prior to its being rigidly clamped in place. Furthermore, by providing means for simultaneously raising the slips from their seats much more rapid and easier adjustment is permitted. At the same time there is no danger of the slips becoming jammed in their operative positions for the reason that the yielding supports automatically raise them from their seats when the strain upon the rope or cable has been released.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a clamp for ropes and the like, the combination with a body having a socket, of a holding-yoke mounted above the body in spaced relation thereto, springs for yieldingly supporting the yoke in said spaced relation to the body, and slips detachably supported upon the yoke and movable therewith, said slips engaging in the socket of the body.

2. In a clamp for ropes and the like, the combination with a body having a socket and provided with guides, of a yoke slidably mounted on the guides, coiled springs interposed between the yoke and the body and surrounding the guides to normally support said yoke above the body, and slips passing through the yoke and engaging in the socket of the body, said slips having flanges that rest upon the yoke, whereby the slips are supported.

3. In a clamp for ropes and the like, the combination with a body having a socket, of a yoke movably mounted on the body, springs interposed between the body and yoke to yieldingly support the latter, and clamping-slips arranged in the socket of the body and passing through the yoke, said slips having an engagement with the yoke and movable therewith.

4. In a clamp for ropes and the like, the combination with a body having a socket, of guides secured to the body on opposite sides of the socket, a holding-yoke slidably mounted on and engaging the guides, springs interposed between the yoke and body to yieldingly support said yoke in spaced relation to the body, and slips passing through the yoke and engaging in the socket of the body, said slips being separate from the yoke and having outstanding flanges that rest upon said yoke.

In testimony that I claim the foregoing as my own I have hereto affixed my signature in the presence of two witnesses.

JOHN B. BRADEN.

Witnesses:
CHAS. KINCAID,
R. W. MCKINNEY.